C. G. SIMONDS.
AIR COMPRESSOR.
APPLICATION FILED APR. 24, 1908.

945,988.

Patented Jan. 11, 1910.
6 SHEETS—SHEET 1.

WITNESSES
W. Ray Taylor.
J. Ellis Glen

INVENTOR
CHARLES G. SIMONDS.
by Allen H. Davis
ATTY.

C. G. SIMONDS.
AIR COMPRESSOR.
APPLICATION FILED APR. 24, 1908.

945,988.

Patented Jan. 11, 1910.
6 SHEETS—SHEET 2.

WITNESSES
W. Ray Taylor.
J. Ellis Glen

INVENTOR
CHARLES G. SIMONDS.
by Albert H. Davis
ATTY.

C. G. SIMONDS.
AIR COMPRESSOR.
APPLICATION FILED APR. 24, 1908.

945,988.

Patented Jan. 11, 1910.
6 SHEETS—SHEET 6.

WITNESSES
W. Ray Taylor.
J. Ellis Glen.

INVENTOR
CHARLES G. SIMONDS.
by Albert G. Davis
ATTY.

UNITED STATES PATENT OFFICE.

CHARLES G. SIMONDS, OF SCHENECTADY, NEW YORK, ASSIGNOR TO GENERAL ELECTRIC COMPANY, A CORPORATION OF NEW YORK.

AIR-COMPRESSOR.

945,988.

Specification of Letters Patent.   Patented Jan. 11, 1910.

Application filed April 24, 1908.   Serial No. 428,945.

*To all whom it may concern:*

Be it known that I, CHARLES G. SIMONDS, a citizen of the United States, residing at Schenectady, county of Schenectady, State of New York, have invented certain new and useful Improvements in Air-Compressors, of which the following is a specification.

My invention relates to air compressors, and more particularly to such compressors as are driven by electric motors, and has for its object a novel construction and arrangement of parts whereby certain improvements in operation and construction are obtained.

Motor driven air compressors, as heretofore built, necessitate the separate oiling of a great number of bearings. These compressors often have gear cases which it has always been found very difficult to keep oil tight, and which it is necessary to remove as well as the gearing in order to remove the motor armature. These compressors have to have a very short stroke of the piston in order to keep a reasonable distance between the centers of the gears, and at the same time keep the machine of reasonable size.

By constructing a motor driven compressor according to my invention, the oiling of all the bearings including the motor bearing is done automatically from the crank chamber and, therefore, requires attention in this respect at only one point. My compressor has no gear case, the gears being contained in the crank chamber, and the armature of the motor may be readily removed. The arrangement of parts in my compressor is such that it may have a long piston stroke with a small piston diameter, requiring small bearings and light parts.

To these ends my invention consists in certain constructions and arrangements of parts which will be pointed out with particularity in the claims annexed to and forming a part of this specification. For a better understanding of my invention, however, reference may be had to the following description taken in connection with the accompanying drawings, in which—

Figure 1:
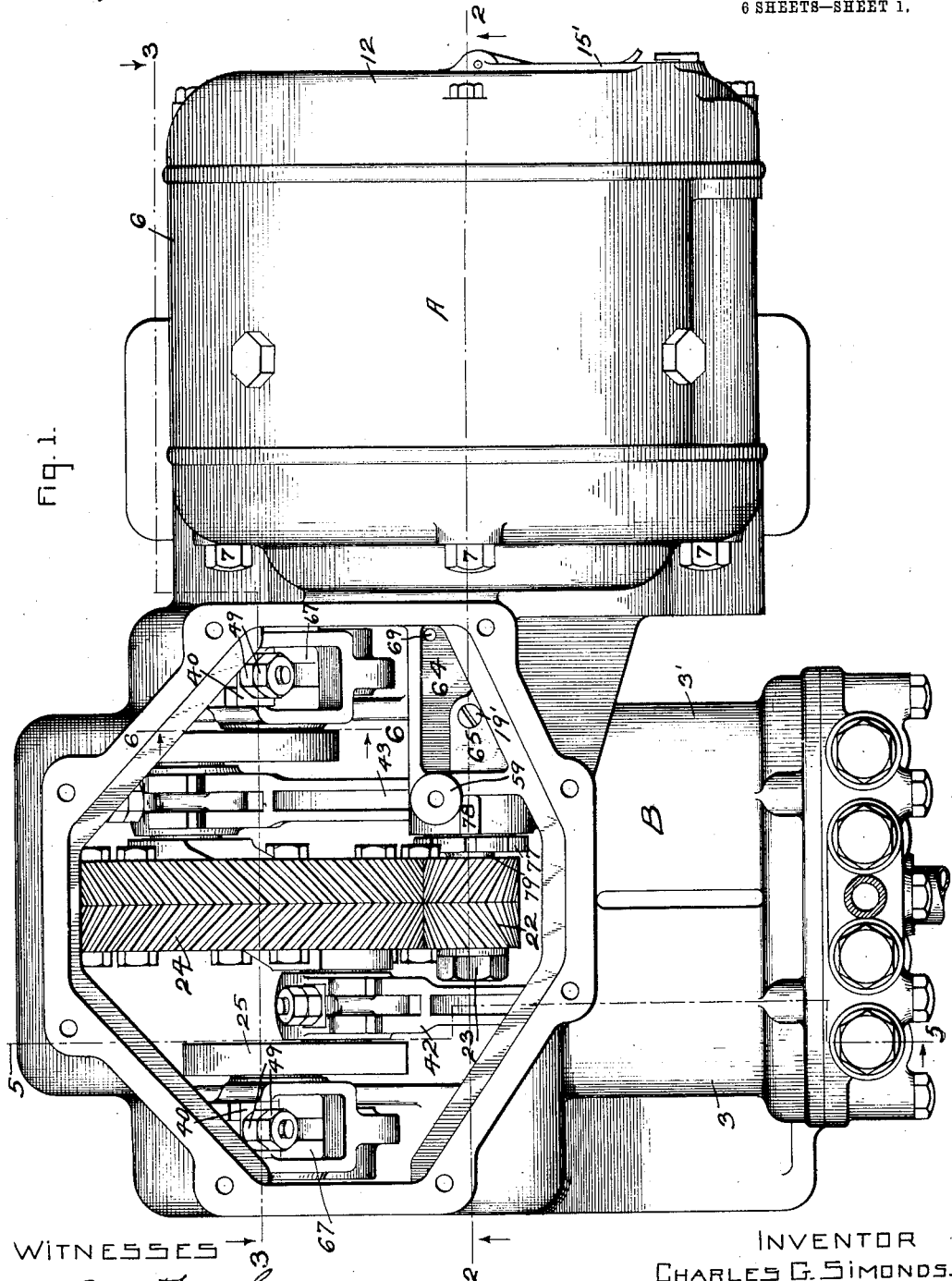
Figure 2:
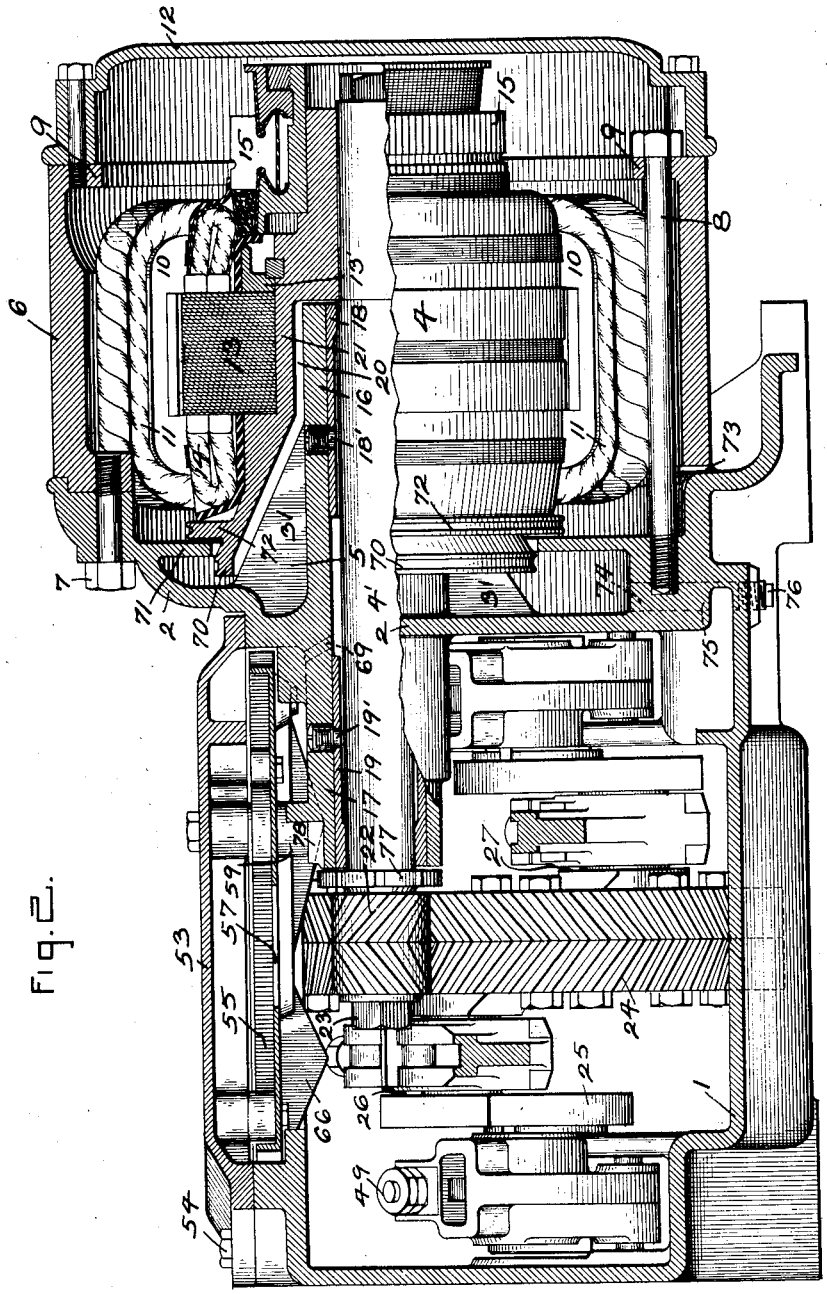
Figure 3:
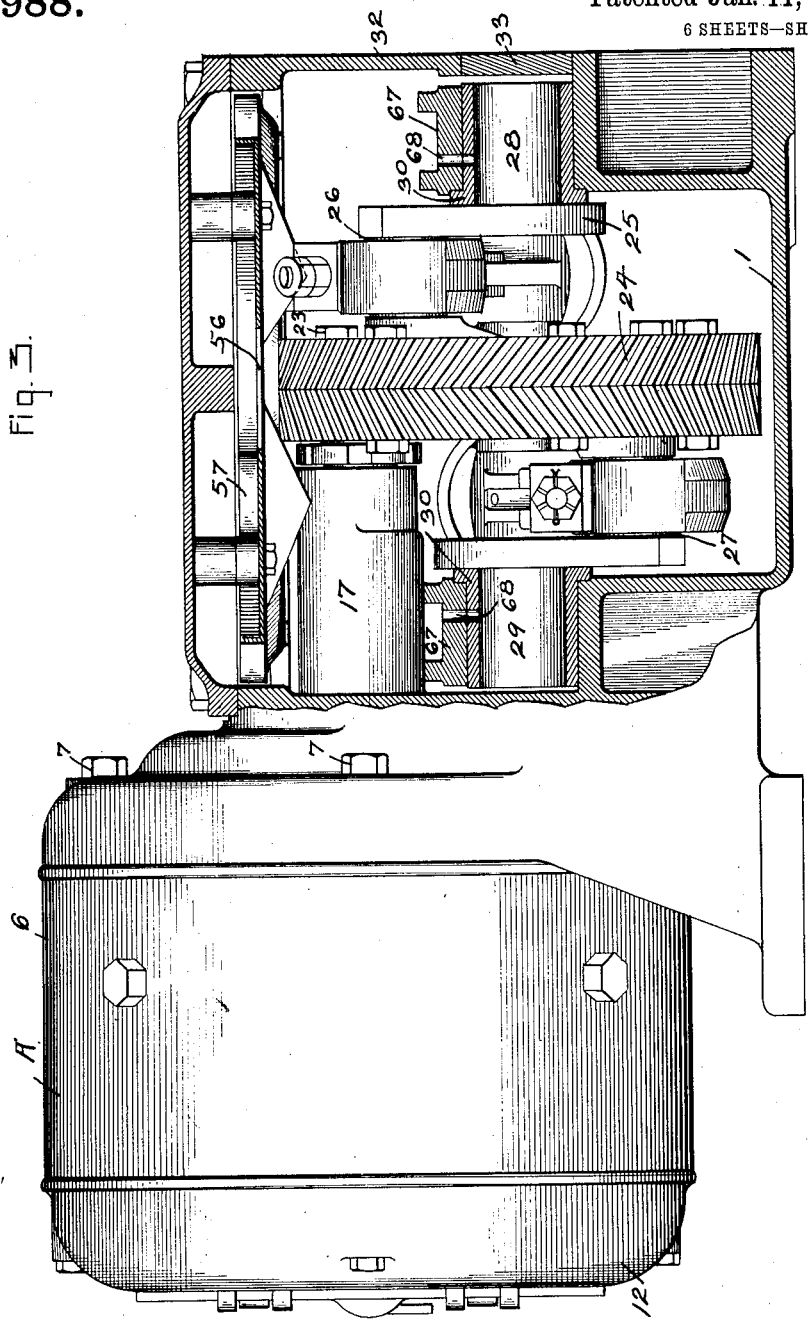
Figure 4:
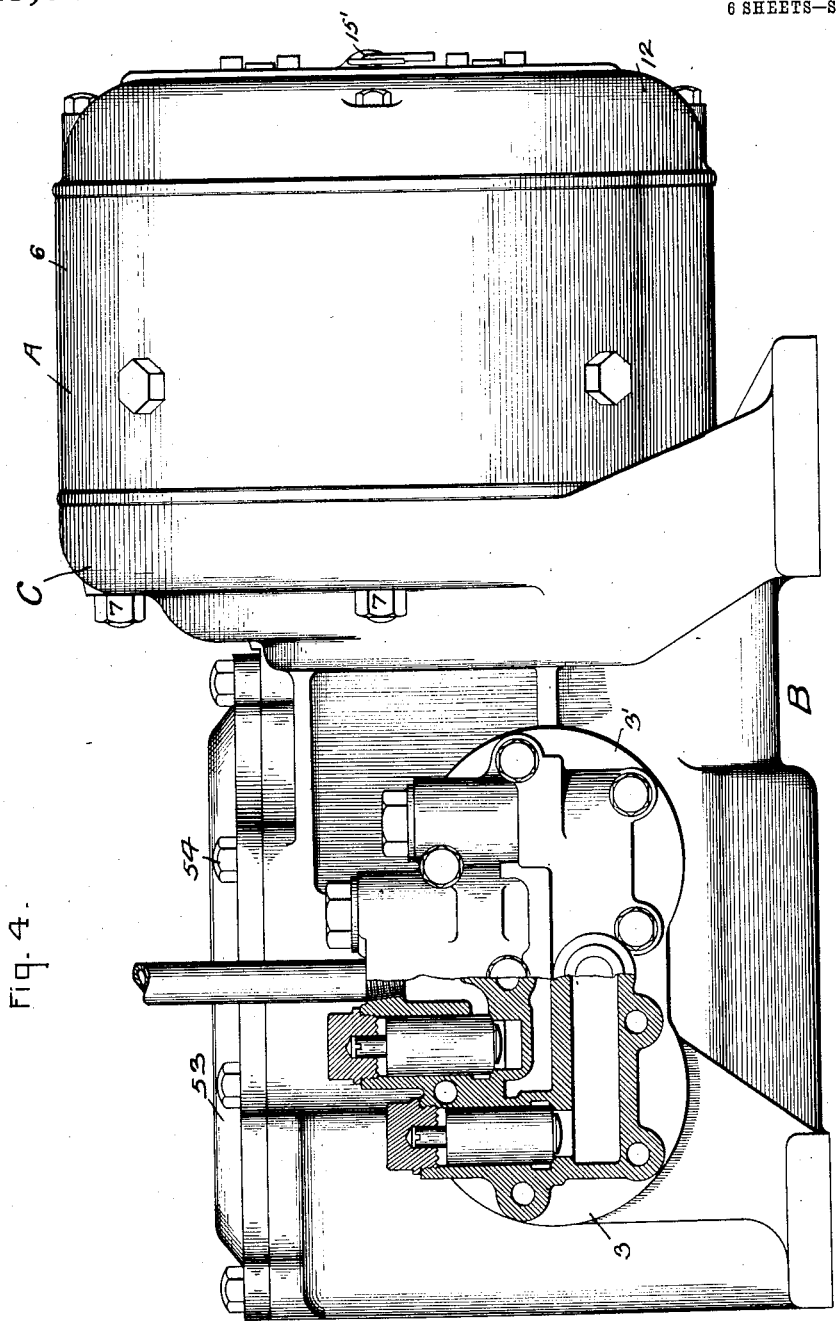
Figure 5:
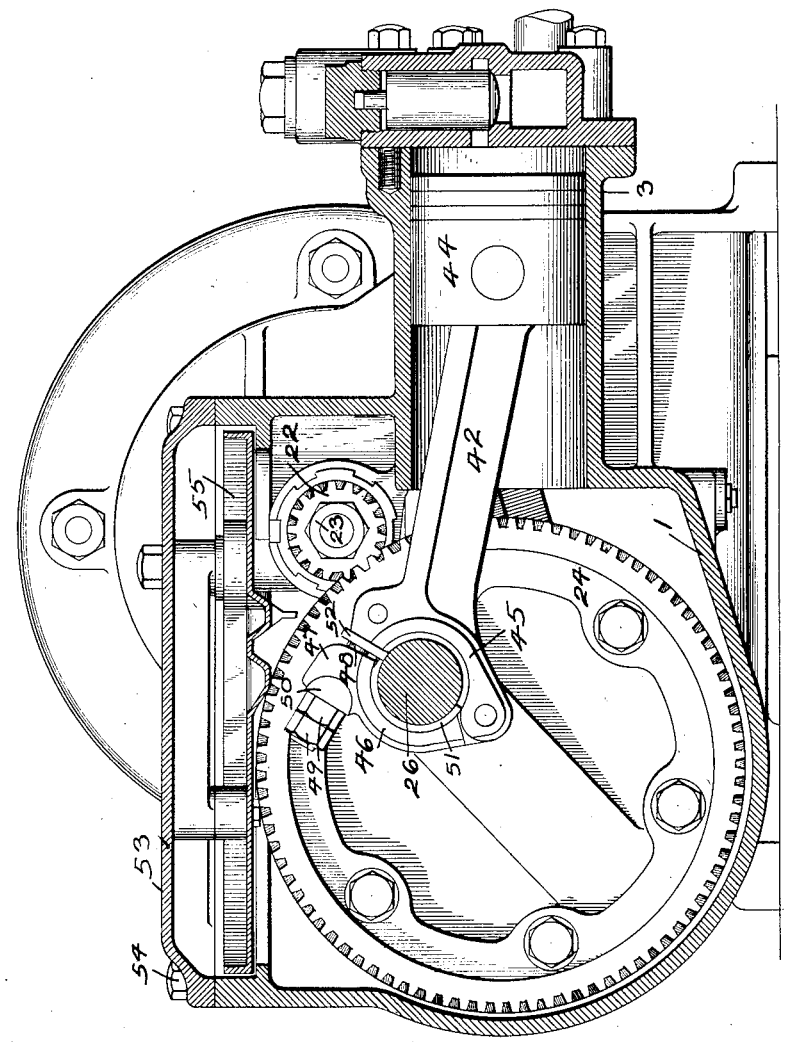
Figure 6:
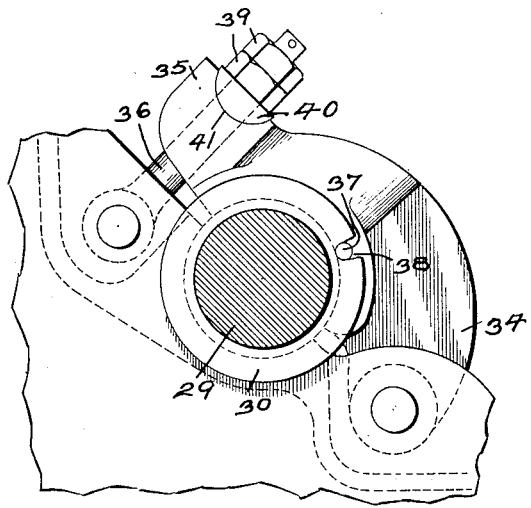
Figure 7:
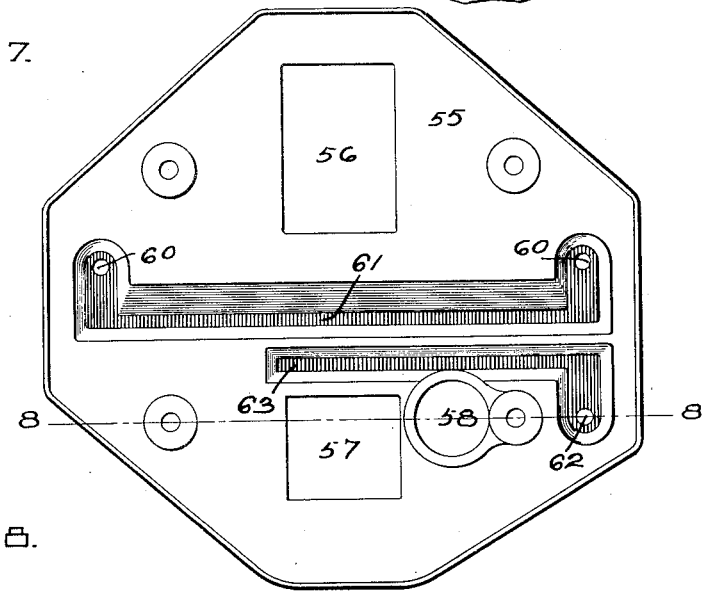
Figure 8:
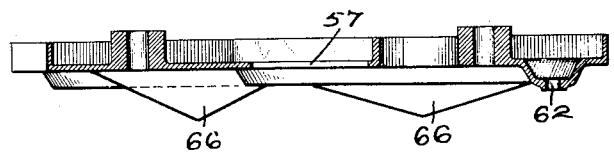

Figure 1 is a plan view of a compressor embodying my invention with the cover plate removed to show the interior construction; Fig. 2 is a section on the line 2 2 of Fig. 1, looking in the direction of the arrows; Fig. 3 is a sectional view taken on the line 3 3 of Fig. 1; Fig. 4 is an elevation of my compressor, part of the casing being in section to show the arrangement of valves; Fig. 5 is a section on the line 5 5 of Fig. 1; Fig. 6 is a section on the line 6 6 of Fig. 1; Fig. 7 is a view of a detail, and Fig. 8 is a section on the line 8 8 of Fig. 7.

The casing of my motor compressor comprises a motor frame A and a compressor casing B located side by side and having a wall C between them containing the armature shaft bearing for the motor. This wall is preferably common to the compressor casing and motor frame so that it forms the end member 2 of the latter. The crank casing 1 is preferably cast integrally with the motor end member 2 and the cylinders 3 and 3'. The motor armature 4 is mounted on the shaft 4' which is journaled in the bearing 5 formed in the end member 2. The field frame 6 is cylindrical in form and is bolted to and is supported wholly by the end member 2, by means of bolts 7 at the top and by means of bolts 8 at the bottom. The bolts 8 enter a flange 9 formed in the motor frame and extend throughout the length of said frame. Field poles 10, having exciting coils 11, are bolted to the motor frame as is the end member 12. The bolts which hold the end member 12 in place enter the flange 9 of the motor frame. The motor armature is built up of laminations 13 mounted on the spider 21. These laminations are held in place by means of a flange 13', and the armature winding 14 is embedded in slots therein. The commutator 15 is connected to the armature winding 14 and is supplied with current by means of brushes which have been omitted from the drawing for the sake of clearness. A hand-hole having a cover 15' supported on hinges, is formed in the end member 12 and allows access to the commutator and brushes.

The bearing for the motor armature has two long extending portions 16 and 17, which are supplied with linings 18 and 19. These linings are held in place and kept from rotating by means of the screws 18' and 19'. The portion 16 of the bearing extends into a recess 20 formed in the armature spider 21, and is stiffened by means of webs 31. It will thus be seen that the motor armature overhangs this bearing and is supported at its center of gravity.

A herring-bone pinion 22, mounted upon the end of the armature shaft 4', is held in place by means of a nut 23 and meshes with a gear 24 mounted on the hub of the crank shaft 25. The herring-bone gear 24 is made in two parts which are bolted together and keyed to the hub of the crank shaft 25 between the crank pins 26 and 27. The crank shaft has crank pins 26 and 27 and shaft portions 28 and 29 at its ends. The ends of this crank are journaled in bearings which are located inside of the crank chamber and supported by the crank casing. These bearings are suitably lined with solid bushings 30, as seen in Fig. 6. In order to drill the lower half of these bearings in the crank chamber it has been found expedient to drill a hole through the end 32 of the casing and afterward insert a plug 33 in this hole.

Fig. 6 shows a detailed view of the bearing for the end 29 of the crank shaft, the bearing for the other end 28 being similar. The upper half of this bearing is formed by a pivoted member 34 having lugs 35 between which is pivoted a fastening bolt 36. The member 34 has a projecting pin 37 which enters an indentation 38 in the flange of the lining 30 and thereby prevents it from turning. The nuts 39 on the end of the bolt 36 press against a washer 40 which has a cylindrical portion resting in a cylindrical seat 41 in the member 34, so that as the nuts 39 are tightened the washer rotates slightly in its seat, and the nuts press firmly on the washer. The second of the nuts acts as a lock nut.

The crank pins 26 and 27 are opposite the cylinders 3 and 3' and have journaled thereon the connecting rods 42 and 43, which are connected to the pistons, one of which is shown at 44, Fig. 5. The axes of the cylinders are thus at right angles to the axis of the armature shaft, but are in a plane considerably below that of the armature, as are also the crank shaft bearings. By arranging the cylinders and crank shaft bearings in this way, the maximum length of stroke for a given diameter of piston is obtained by making the gear 24 of large diameter. Consequently, for a given size compressor, my machine has a long piston stroke with a small piston diameter.

Referring to Fig. 5, it will be seen that one half of the bearing 45 is formed by the connecting rod 42, and the other half by means of a pivoted member 46 having lugs 47 between which is pivoted a fastening bolt 48. The nuts 49 press against a washer 50 similar to the washer 40. A split lining 51 surrounds the arm 26 and is prevented from turning by means of a wedge 52 made of leaves of metal. As the lining wears leaves may be removed from the wedge and the nuts 49 tightened, the action of the washer 50 being similar to that of the washer 40 as explained above. The bearing about the arm 27 is similar to that about the arm 26.

The crank casing has an opening at the top which is covered by a cover plate 53 fastened to the casing by bolts 54. Bolted to the cover plate is an auxiliary cover or oil pan 55, which is shown in detail in Figs. 7 and 8. The openings 56 and 57 in this pan are directly above the gears 22 and 24. The hole 58 is made to allow the passage of the part 59 therethrough, and consequently the oil pan must always be placed in its proper position. When in this position the holes or openings 60 are directly above the crank shaft bearings. A groove 61 in the surface of the pan connects the holes or openings 60 together. The hole or opening 62 is also connected to a groove 63, and is directly above a pan or basin 64 formed in the shelf 65 which is in one of the upper corners of the crank chamber. Wedge-shaped portions 66, projecting from the underside of the pan, are directly over the connecting rods. Oil is contained in the lower portion of the crank chamber and the revolution of the gear 24 carries oil to the gear 22. When the compressor is in operation oil is thrown from the gears by centrifugal force through the openings 56 and 57 and collects in the grooves 61 and 63 in the oil pan and is conducted by these grooves to the holes or openings 60 and 62. The oil drips from the holes 60 into the cup-shaped space 67 in the member 34, then through holes 68 in the members 34 and linings 30 upon the shaft portions 28 and 29. The oil which drips from the hole or opening 62 is caught in the basin 64 and flows through the hole 69 to the bearing in which the motor shaft 4' is carried. The oil that works out along the shaft under the lining 19 escapes into the crank chamber and is there again thrown about by the gear wheels. The portion of the oil which works its way under the lining 18 escapes into the recess 20 formed in the armature spider. The revolution of the armature spider causes the oil to be thrown out from the end of the flange 70 where it is caught by the motor end member 2 and prevented from leaking into the motor frame by the flange 71 formed on the motor end member. If, however, any oil should leak into the motor frame, the hole 73 is provided to allow the escape of such oil. The oil caught in the motor end member collects at the bottom in the chamber 74 and passes back to the bottom of the crank chamber by means of the passage 75. A plug 76 is provided to stop up the end of this passage, and by removing it the oil may be drained from the crank chamber. The oil which is splashed upon the wedged-shaped portions 66 drips therefrom upon the connecting rods and finds its way to the shafts 26 and 27.

In case it is desired to remove the armature of the motor it is only necessary to remove the end bonnet 12 together with the brush rigging, and the cover plate 53, together with the oil pan 55. The nut 23 on the end of the motor shaft 4' is then removed and a key inserted in one of the slots in the nut 77, which is screwed upon the armature shaft between the gear 22 and the end 17 of the bearing, the other end of the key entering a slot 78 formed in this end of the bearing. By revolving the motor armature the nut 77 is unscrewed, the motor armature moves away from the gears, the projecting portion 79 of the nut engaging the pinion 22 and forcing it off the shaft, the herring-bone on the gears preventing them from moving in the direction of their axes and, consequently, the armature must move away from the gears.

In case it is desired to remove a field pole without disturbing any more of the machine than is necessary, the end member 12 is removed together with the brush rigging and the fastening bolts, which hold the field pole in place, and then this field pole may be readily removed without disturbing the motor armature. Similarly, the whole motor frame 6 may be removed. It will thus be seen that my compressor can have any of its parts taken out for replacement or repairs by disturbing the minimum number of other parts.

I desire it to be understood that my invention is not limited to the particular construction shown and described, and I aim in the appended claims to cover all modifications which do not depart from the spirit of my invention.

What I claim as new and desire to secure by Letters Patent of the United States, is:—

1. In an electric motor driven air compressor, a casing comprising a motor frame and a compressor casing located side by side and having a wall between them, a single armature shaft bearing formed in said wall, an armature shaft, an armature of the electric motor mounted on one end of said shaft, and a pinion for driving said compressor mounted at the other end.

2. In an electric motor driven air compressor, a casing comprising a motor frame and a compressor casing located side by side and having a wall between them, a single elongated armature shaft bearing formed in said wall, an armature shaft, an over-hung armature mounted on one end of said shaft, and a pinion for driving said compressor mounted at the other end.

3. In an electric motor driven air compressor, a casing comprising a motor frame and a crank casing located side by side and having a wall between them, an armature shaft bearing formed in said wall, an armature shaft journaled in said armature shaft bearing and carrying at one end the armature of the electric motor and at its other end a pinion, a crank having crank pins, bearings contained within said crank casing, the ends of said crank shaft being journaled therein, and a gear on said crank shaft meshing with said pinion.

4. In an electric motor driven air compressor, a casing comprising a motor frame and a crank casing located side by side and having a wall between them, an armature shaft bearing formed in said wall, an armature shaft journaled in said armature shaft bearing and carrying at one end the armature of the electric motor and at its other end a pinion, a crank having crank pins, bearings contained within said crank shaft, the ends of said crank shaft being journaled therein, and a gear on said crank shaft between said crank pins and meshing with said pinion.

5. In an electric motor driven air compressor, a casing comprising a motor frame and a crank casing located side by side and having a wall between them, an elongated armature shaft bearing formed in said wall, an armature shaft, an overhung armature mounted on one end of said shaft, a pinion mounted on the other end of said armature shaft, a crank shaft having crank pins, bearings contained within said crank casing, the ends of said crank shaft being journaled therein, and a gear on said crank shaft meshing with said pinion.

6. In an electric motor driven air compressor, a casing comprising a motor frame and a crank casing located side by side and having a wall between them, an elongated armature shaft bearing formed in said wall, an armature shaft, an overhung armature mounted on one end of said shaft, a pinion mounted on the other end of said armature shaft, a crank shaft having crank pins, bearings contained within said crank casing, the ends of said crank shaft being journaled therein, and a gear on said crank shaft between said crank pins and meshing with said pinion.

7. In an electric motor driven air compressor, a casing comprising a motor frame and a crank casing located side by side and having a wall between them, an armature shaft bearing formed in said wall, an armature shaft carrying at one end the armature of the electric motor and at its other end a pinion, a crank shaft, bearings contained within said crank casing, the ends of said crank shaft being journaled therein, a gear on said crank shaft meshing with said pinion, said gear and pinion being contained in said crank casing, pump cylinders, and pistons therein connected to said crank shaft.

8. In an electric motor driven air compressor, a casing comprising a motor frame and a crank casing located side by side and having a wall between them, an armature shaft bearing formed in said wall, an armature shaft carrying at one end the armature of the electric motor and at its other end a pinion, a crank shaft, a gear mounted upon the hub of said crank shaft and meshing with said pinion, bearings contained within the crank casing, the ends of said crank shaft being journaled therein, pump cylinders, and pistons therein connected to said crank shaft.

9. In an electric motor driven air compressor, a casing comprising a motor frame and a crank casing located side by side and having a wall between them, a single elongated armature shaft bearing formed in said wall, an armature shaft, an overhung armature mounted on one end of said shaft and a pinion mounted on its other end, a crank shaft, bearings contained within the crank casing, the ends of said crank shaft being journaled therein, a gear on said crank shaft meshing with said pinion, said gear and pinion being contained in said crank casing, pump cylinders, and pistons therein connected to said crank shaft, the axes of said cylinders being arranged substantially at right angles to the axis of said armature shaft but not in the same plane.

10. In an electric motor driven air compressor, a casing comprising a motor end frame member and a compressor casing cast integrally therewith, said end member forming a wall for the motor frame and the compressor casing, a field frame for the electric motor bolted to said end member and supported wholly thereby, an armature shaft bearing formed in said end member, an armature shaft carrying on one side of said bearing the armature of an electric motor and on the other side a pinion for driving said compressor, and a second end member fastened to and supported wholly by the field frame.

11. In a motor driven air compressor, a crank casing, a crank shaft therein geared to the driving motor through a gear and pinion drive, and means for oiling the compressor bearings comprising an oil pan located above and in close proximity to said gearing and substantially filling the top of said casing, said pan having an opening directly over the gearing and so positioned with respect to the same that the gearing in operation throws oil through said opening upon said pan.

12. In a motor driven air compressor, a casing comprising a motor frame and a compressor casing located side by side and having a wall between them, an armature shaft bearing formed in said wall, a crank shaft in said compressor casing geared to the driving motor through a gear and pinion drive, and means for oiling the armature shaft bearing comprising an oil pan located above and in close proximity to said gearing and substantially filling the top of said casing, said pan having an opening directly over the gearing and so positioned with respect to the same that the gearing in operation throws oil through said opening upon said pan.

13. In a motor driven air compressor, a crank casing open at the top, a cover plate for said casing, a crank shaft therein geared to the driving motor through a gear and pinion drive, and an auxiliary cover for said casing forming an oil pan in close proximity to said gearing, said oil pan having an opening directly over the gearing and so positioned with respect to the same that the gearing in operation throws oil through the opening upon said auxiliary cover.

14. In a motor driven air compressor, a crank casing open at the top, a cover plate for said casing, a crank shaft therein and geared to the driving motor through a gear and pinion drive, and an auxiliary cover for said casing fastened to said cover plate, said auxiliary cover forming an oil pan in close proximity to said gearing, said oil pan having an opening directly over the gearing and so positioned with respect to the same that the gearing in operation throws oil through the opening upon said auxiliary cover.

15. In a motor driven air compressor, the combination with a compressor casing, comprising a crank casing and pump cylinders, a crank shaft therein geared to the driving motor through a gear and pinion drive, and an oil pan located above and in close proximity to said gear and substantially filling the top of said casing, said pan having an opening directly over the gearing and so positioned with respect to the same that the gearing in operation throws oil on the pan and openings supplying the compressor bearings with oil, said pan being provided with a grooved portion or portions for collecting the oil and feeding it to said openings.

16. In a motor driven air compressor, a casing comprising a motor frame and a compressor casing located side by side and having a wall between them, an armature shaft bearing formed in said wall, a crank shaft in said compressor casing geared to the driving motor through a gear and pinion drive, bearings for said crank shaft contained within said crank casing, pistons in said pump cylinders, connecting rods connecting said pistons to said crank shaft, an oil pan located above and in close proximity to said gearing and substantially filling the top of said casing, said pan having an opening directly over the gearing and so positioned with respect to the same that the gearing in operation throws oil upon the pan and openings supplying said compressor and armature shaft bearings with oil, and wedge-shaped portions projecting from the underside of the pan directly above the connecting rods for supplying oil to said rods.

17. In a motor driven air compressor, a casing comprising a motor frame and a compressor casing located side by side and having a wall between them, an armature shaft bearing formed in said wall, an oil basin formed in said wall for supplying oil to said armature shaft bearing, a crank in said compressor casing geared to the driving motor through a gear and pinion drive, and an oil pan located above and in close proximity to said gearing and substantially filling the top of the compressor casing, said pan having an opening directly over the gearing and so positioned with respect to the same that the gearing in operation throws oil upon the pan and an opening supplying said basin with oil.

18. In a motor driven air compressor, a casing comprising a motor end frame member and a compressor casing, an armature shaft, a bearing for said shaft in said end member, a flange on said armature shaft, a flange on said motor end member, and means for oiling said armature shaft bearing from said compressor casing, said flange on the end member and the end member forming a chamber for catching oil thrown from the flange on the armature shaft, said chamber communicating by means of a passage with the compressor chamber.

In witness whereof, I have hereunto set my hand this 23rd day of April, 1908.

CHARLES G. SIMONDS.

Witnesses:
BENJAMIN B. HULL,
HELEN ORFORD.